United States Patent
Krasner et al.

(10) Patent No.: US 6,724,807 B1
(45) Date of Patent: Apr. 20, 2004

(54) METHODS AND APPARATUSES FOR PROCESSING OF GLOBAL POSITIONING SYSTEM SIGNALS WITH A MATCHED FILTER

(75) Inventors: Norman F. Krasner, San Carlos, CA (US); Paul Conflitti, San Ramon, CA (US)

(73) Assignee: Snaptrack Inc., San Diego, CA (US)

( * ) Notice: Subject to any disclaimer, the term of this patent is extended or adjusted under 35 U.S.C. 154(b) by 409 days.

(21) Appl. No.: 09/729,812

(22) Filed: Dec. 4, 2000

(51) Int. Cl.[7] ................................................ G01S 5/14
(52) U.S. Cl. ...................................................... 375/143
(58) Field of Search ................................ 375/143, 145, 375/149, 137, 343, 142, 150, 130, 148, 152, 147, 267, 347; 342/357.06, 357.02, 157.12, 357.05, 418; 701/215; 708/314

(56) References Cited

U.S. PATENT DOCUMENTS

| | | | |
|---|---|---|---|
| 4,894,842 A | | 1/1990 | Broekhoven et al. |
| 5,579,338 A | * | 11/1996 | Kojima ........................ 375/208 |
| 5,945,944 A | * | 8/1999 | Krasner ................... 342/357.06 |
| 6,044,105 A | * | 3/2000 | Gronemeyer ................ 375/207 |
| 6,133,874 A | * | 10/2000 | Krasner ................... 342/357.15 |
| 6,208,290 B1 | * | 3/2001 | Krasner ................... 342/357.05 |
| 6,208,291 B1 | * | 3/2001 | Krasner ................... 342/357.12 |
| 6,289,041 B1 | * | 9/2001 | Krasner ....................... 375/152 |
| 6,532,271 B1 | * | 3/2003 | Hwang et al. ............... 375/326 |

FOREIGN PATENT DOCUMENTS

| | | |
|---|---|---|
| EP | 0948174 A2 | 10/1999 |
| WO | WO 98/25157 | 6/1998 |
| WO | WO 00/10030 | 2/2000 |

OTHER PUBLICATIONS

PCT International Search Report, PCT/US 01/46968, Dec. 4, 2001.

* cited by examiner

*Primary Examiner*—Mohammad H. Ghayour
*Assistant Examiner*—Dung X. Nguyen
(74) *Attorney, Agent, or Firm*—Philip Wadsworth; Charles D. Brown; Richard A. Bachand

(57) ABSTRACT

Methods and apparatuses for processing Satellite Positioning System (SPS) signals. In one exemplary method, a first set of frequency coefficients, which corresponds to a first Doppler frequency of an SPS signal, is determined, and said SPS signal is processed in a matched filter with the first set of frequency coefficients during a first window of time. A second set of frequency coefficients, which corresponds to a second Doppler frequency of the SPS signal, is determined, and the SPS signal is processed in the matched filter with the second set of frequency coefficients during a second window of time, where the first and second windows of time occur within a period of time which is not greater than one SPS frame period. In another exemplary method, a first SPS signal is processed in a matched filter with a first set of pseudonoise (PN) coefficients during a first window of time, where the first set of PN coefficients corresponds to the first SPS signal, and a second SPS signal is processed in the matched filter with a second set of PN coefficients (which correspond with the second SPS signal) during a second window of time, wherein the first window and the second windows occur within a period of time not greater than one SPS frame period.

34 Claims, 10 Drawing Sheets

METHODS AND APPARATUSES FOR PROCESSING OF GLOBAL POSITIONING SYSTEM SIGNALS WITH A MATCHED FILTER

FIELD OF THE INVENTION

The present invention relates generally to the field of satellite positioning systems, such as the U.S. Global Positioning System, and more particularly to receiving and tracking signals from satellite positioning system satellites.

BACKGROUND OF THE INVENTION

Most conventional Satellite Positioning Systems (SPS), such as the Global Positioning System (GPS) receivers utilize serial correlators in order to acquire, track and demodulate signals transmitted from the SPS satellites, such as the GPS satellites. Each transmitted GPS signal is a direct sequence spread spectrum signal. The signal available for commercial use is that associated with a standard positioning service and utilizes a direct sequence biphase spreading signal with a 1.023 Mchip per second spread rate placed upon a carrier at 1575.42 MHz. The pseudorandom noise, or pseudonoise (PN) sequence length is 1,023 chips, corresponding to a one millisecond time period. Each satellite transmits a different PN code (sometimes referred to as a Gold code) which allows the signals to be simultaneously transmitted from several satellites and to be simultaneously received by a receiver, with little interference from one another. In addition, data superimposed on each signal is a 50 baud binary phase shift keyed (BPSK) data with bit boundaries aligned with the beginning of a PN frame; 20 PN frames occur over one data bit period which is 20 milliseconds.

An important operation in processing GPS signals is initial synchronization to the pseudorandom sequence that modulates the carrier. This is conventionally done in a serial fashion using the set of correlators, which search for the epoch of the pseudorandom sequence. A typical initial acquisition strategy involves searching the PN code over each of the 1023 symbols in ½ chip intervals, which implies a total of 2046 hypotheses. Furthermore, it is often necessary to search over a range of carrier frequency since Doppler and local oscillator errors would otherwise cause the signals to be undetectable. This results in additional frequency hypotheses to test. For high sensitivity applications, each hypothesis can require a dwell time of many milliseconds, and even seconds in some instances. Accordingly, the acquisition process may be very lengthy without the use of many correlators.

Global Positioning System (GPS) receivers receive GPS signals transmitted from orbiting GPS satellites and determine the time-of-arrival of appropriate codes by comparing the time shift between the received signal and an internally generated signal. The signal comparison is performed in a correlation process which entails multiplying and integrating the received and generated signals. A typical prior art serial correlator circuit utilized in common GPS receivers is illustrated in FIG. 1. The correlator 50 receives an input GPS signal 52 and combines, in multiplier 54, the received signal 52 with an internally generated PN code produced by a PN generator 60. A magnitude squaring (or other detection) operation 56 is then performed on an accumulated set of samples of the combined signal. A micro-controller 58 controls the sequencing of PN chips generated by PN generator 60. According to the system of correlator 50, the received signal 52 is compared to a long sequence of PN chips, one time offset at a time, thus requiring a very long period of time to search over all offsets corresponding to one PN frame.

An alternative method for acquiring GPS signals is to use matched filtering approaches; see, for example, co-pending U.S. patent application Ser. No. 09/021,854, which was filed Feb. 11, 1998 and is entitled "Fast Acquisition, High Sensitivity GPS Receiver" by the inventor Norman F. Krasner. A matched filter, matched to a full pseudorandom frame, may be thought of as a set of 2046 correlators if ½ chip spacing is employed. If one wishes to search for M parallel GPS signals, then M such matched filters may be employed in parallel. The foregoing patent application entitled "Fast Acquisition, High Sensitivity GPS Receiver" shows examples of various types of matched filters which may be used to implement GPS receivers. While the use of such matched filter GPS receivers is efficient, there is often still a desire to further improve efficiency, especially when certain a priori knowledge of signal parameters is available.

SUMMARY OF THE INVENTION

The present invention discloses various methods and apparatuses for acquiring and tracking Global Positioning System signals or other types of satellite positioning system signals with a satellite positioning system receiver which includes a matched filter. In one exemplary method of the invention, a first set of frequency coefficients, which corresponds to a first Doppler frequency of an SPS signal, is determined, and the SPS signal is processed in a matched filter with the first set of frequency coefficients during a first window of time. A second set of frequency coefficients, which corresponds to a second Doppler frequency of the SPS signal, is determined, and the SPS signal is processed in the same matched filter with the second set of frequency coefficients during a second window of time, where the first and the second windows of time occur within a period of time which is not greater than one SPS frame period.

In another exemplary method of the present invention, a first SPS signal is processed in a matched filter with a first set of pseudonoise (PN) coefficients during a first window of time, where the first set of PN coefficients corresponds to the first SPS signal and a second SPS signal is processed in the same matched filter with a second set of PN coefficients (which correspond with the second SPS signal) during a second window of time, wherein the first window of time and the second window of time occur within a period of time not greater than one SPS frame period.

Various apparatuses are also described herein.

BRIEF DESCRIPTION OF THE DRAWINGS

The present invention is illustrated by way of example and not by way of limitation in the figures of the accompanying drawings in which references indicate similar elements and in which.

DETAILED DESCRIPTION

Methods and apparatuses for receiving SPS signals with a matched filter are described. In the following description, for purposes of explanation, numerous specific details are set forth in order to provide a thorough understanding of the present invention. It will be evident, however, to those in the art that the present invention may be practiced without these specific details. In other instances, well known structures and devices are shown in block diagram form to facilitate explanation.

Figure 7:
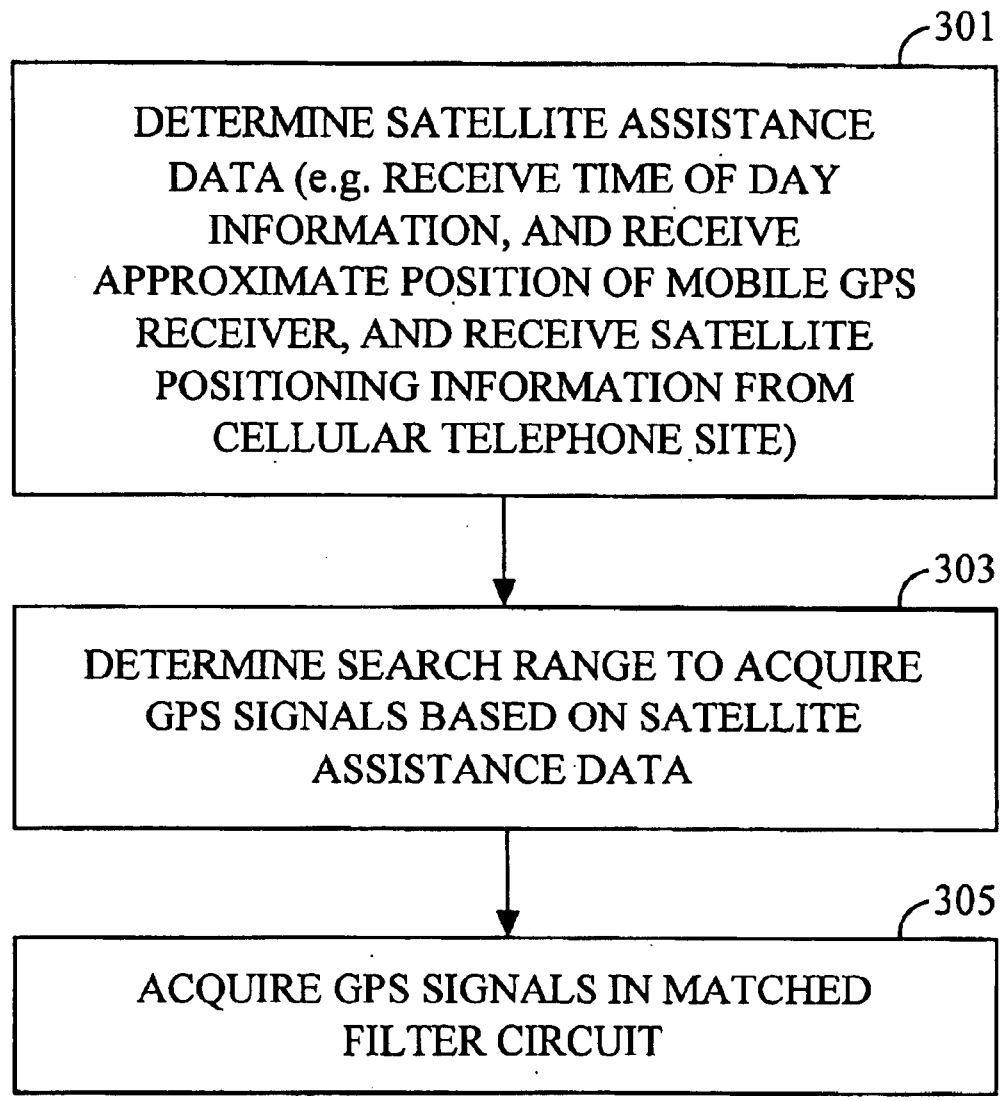
FIG. 7 shows a flowchart depicting a preliminary set of operations which may be employed in certain embodiments of the present invention.

Certain embodiments of the present invention use methods of time sharing of a matched filter after using acquisition assistance data in order to reduce the search range for the code epochs. FIG. 7, which will be described further below, shows an example of the determination of satellite assistance data, which is used to determine a search range in order to acquire GPS signals or other SPS signals based on the satellite assistance data. This satellite assistance data is used to narrow the search range in the acquisition process of the SPS signals, thereby allowing time sharing of the matched filter, such as the methods shown in FIGS. 8 and 9 which will be described further below.

Figure 8:
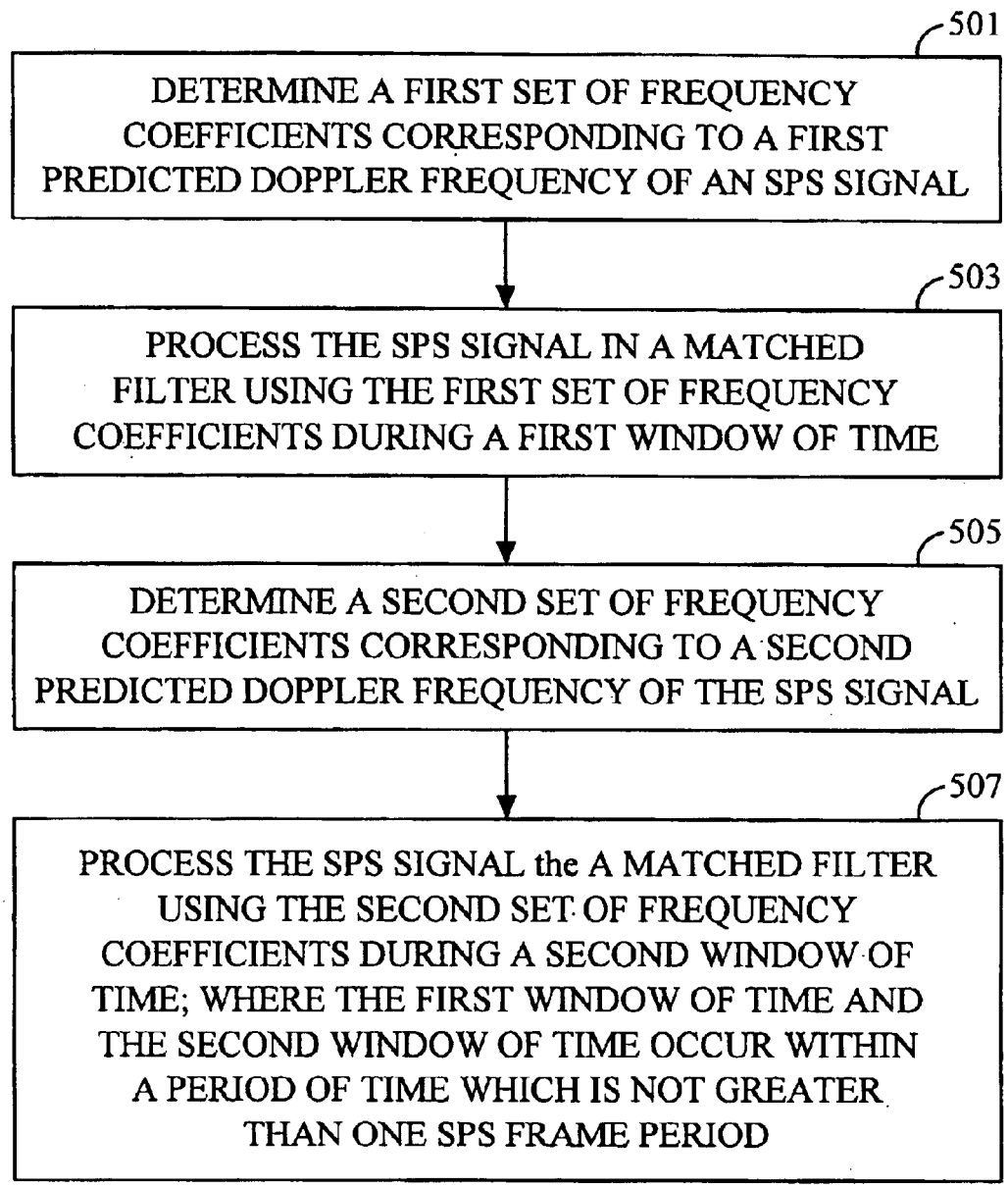
FIG. 8 shows a flowchart indicating one method according to one embodiment of the present invention.

Various different types of satellite assistance data may be available, such as when there is some a priori timing information available. For example, certain cellular signals, such as North American CDMA cellular signals (e.g. IS 95 CDMA cellular telephone signals), provide accurate time-of-day information. This time-of-day information plus other satellite assistance data, such as estimated Dopplers to satellites in view, approximate knowledge of location of the mobile GPS receiver and satellite positioning information (e.g. satellite ephemeris data or satellite almanac), allow a GPS receiver to estimate, approximately, the time-of-arrival of the GPS signals. For example, with an initial position uncertainty of around 5 km (a typical cell size) and accurate time-of-day information, these times of arrival may be estimated to ±16.7 microseconds. If code epochs are to be examined in ½ chip intervals, then this total time interval of 33.3 microseconds may be examined in 67 steps. This is compared to a total of 2046 steps for a full GPS frame of 1023 chips. In this example a matched filter's output signal need only be computed for 33.3 microseconds out of the 1 millisecond frame period, or about 1/30 of the total frame. This active period is called the "active window," or simply "window." Accordingly, it is possible to utilize the matched filter (such as the exemplary matched filter shown in FIG. 2A which will be described below) for other processing purposes during the other 29/30 portion of the frame. In particular, it is possible to rapidly reprogram the matched filter with other weighting coefficients, for example those corresponding to different assumed Doppler frequencies, thus increasing the efficiency in usage of this matched filter circuit. In this particular example, it would be possible to examine 30 different assumed Doppler frequencies with this one matched filter, each producing outputs corresponding to 1/30 of a frame. FIG. 8, discussed further below, shows an example of such a method.

Such time-sharing of the matched filter does not need to result in any loss of sensitivity. The output of the matched filter corresponding to any assumed code epoch utilizes input data information corresponding to a full 1 millisecond frame period. Certain prior art has used time sharing methods, in which time sharing is used but there is loss of sensitivity. For example, it is common to "tune" a correlator to several different frequencies in a slow manner to acquire the carrier frequency of a PN signal. This results in sensitivity loss since the input signal is only observed at a given frequency when the correlator is tuned to that frequency. Such tuning in the prior art is done at a rate which is once per one or more GPS frames. In the current invention the tuning rate is multiple times per frame.

Figure 9:
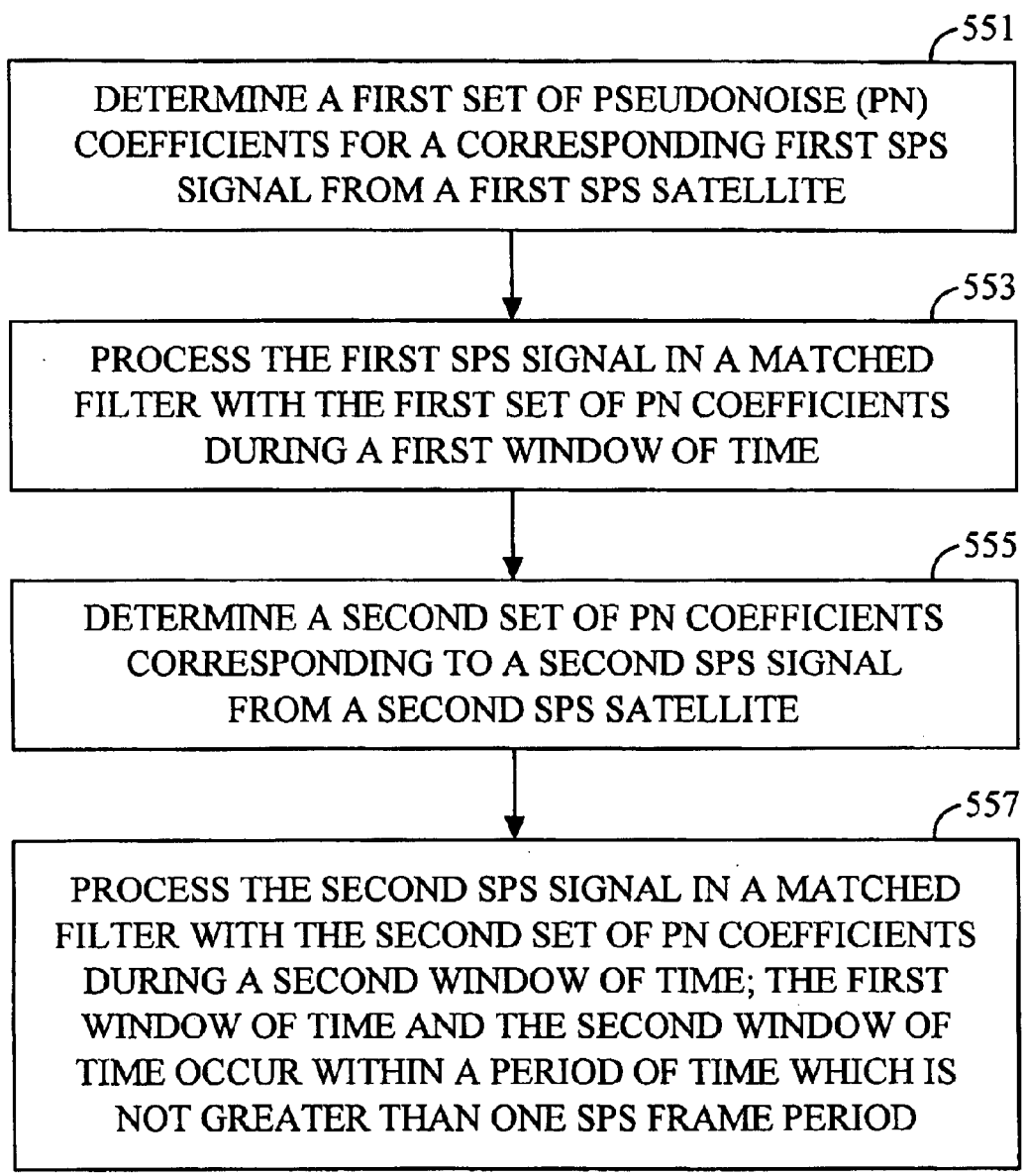
FIG. 9 shows another method according to another embodiment of the present invention.

Another method of time-sharing a matched filter would be to utilize it to process addition PN codes, corresponding to other satellite signals, during periods of inactivity (when the window is inactive). FIG. 9, discussed further below, shows an example of such a method. This is useful, for example, if the number of parallel matched filters is less than the total number of GPS signals to be examined. Again, there is no need to have any loss of sensitivity, even though the filter is time-shared among several PN codes. This is in contrast to prior art situations where a matched filter might be applied sequentially to process multiple GPS signals, and hence would not continuously observe each of these constituent signals.

Figure 1:
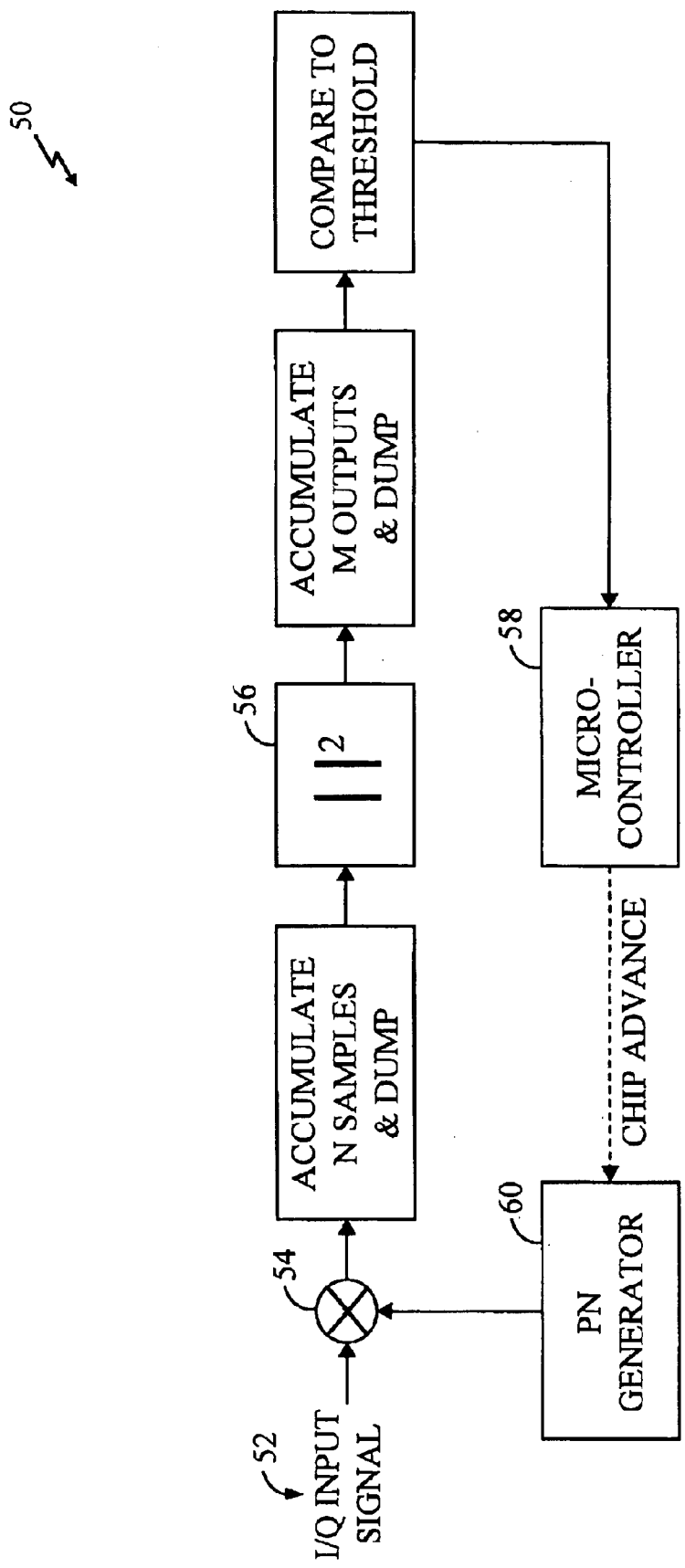
FIG. 1 is a block diagram representation of a prior art GPS correlator circuit.
Figure 2A:
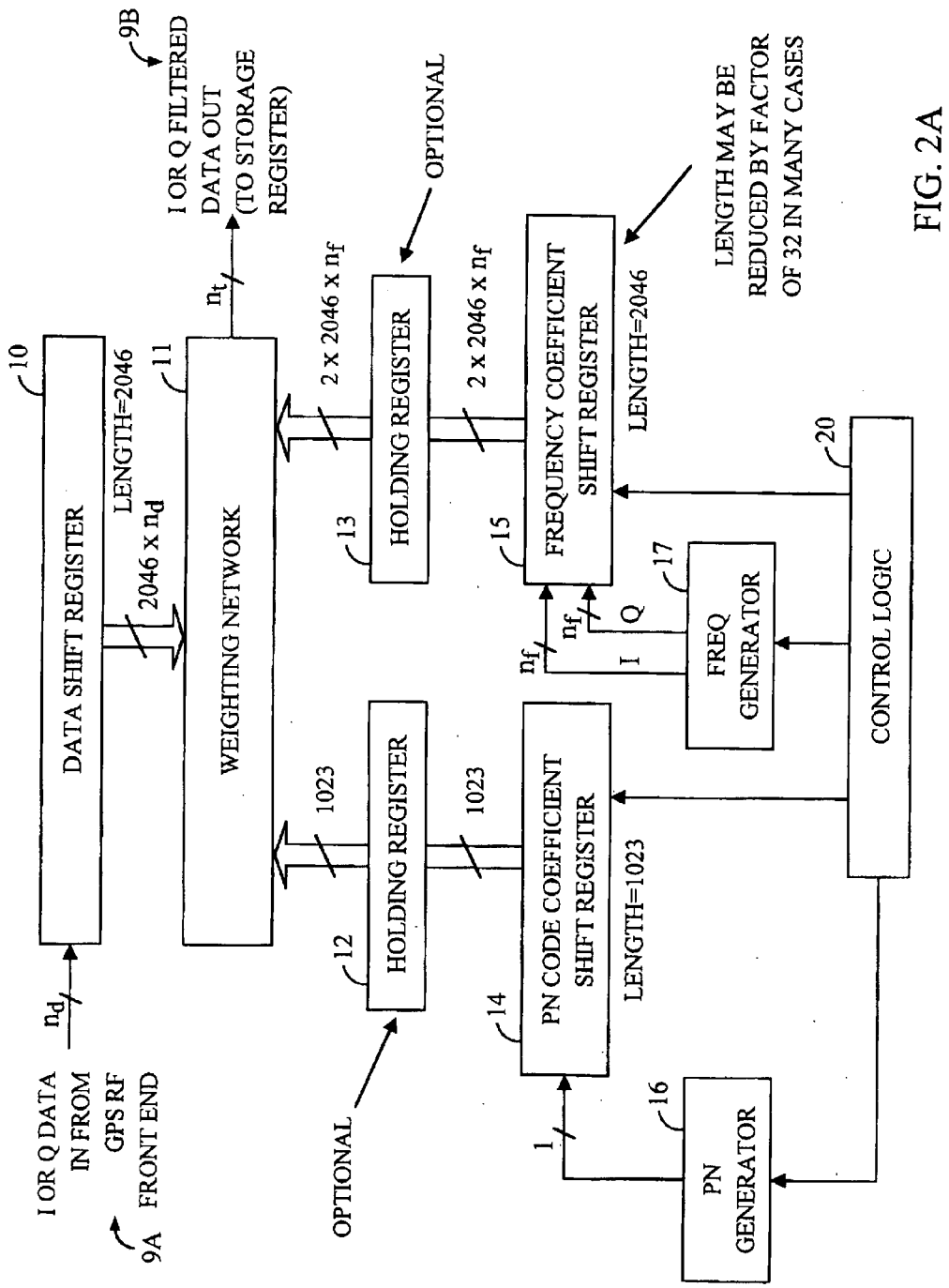
FIG. 2A is a block diagram representation of an SPS acquisition circuit according to one embodiment of the present invention.
Figure 3:
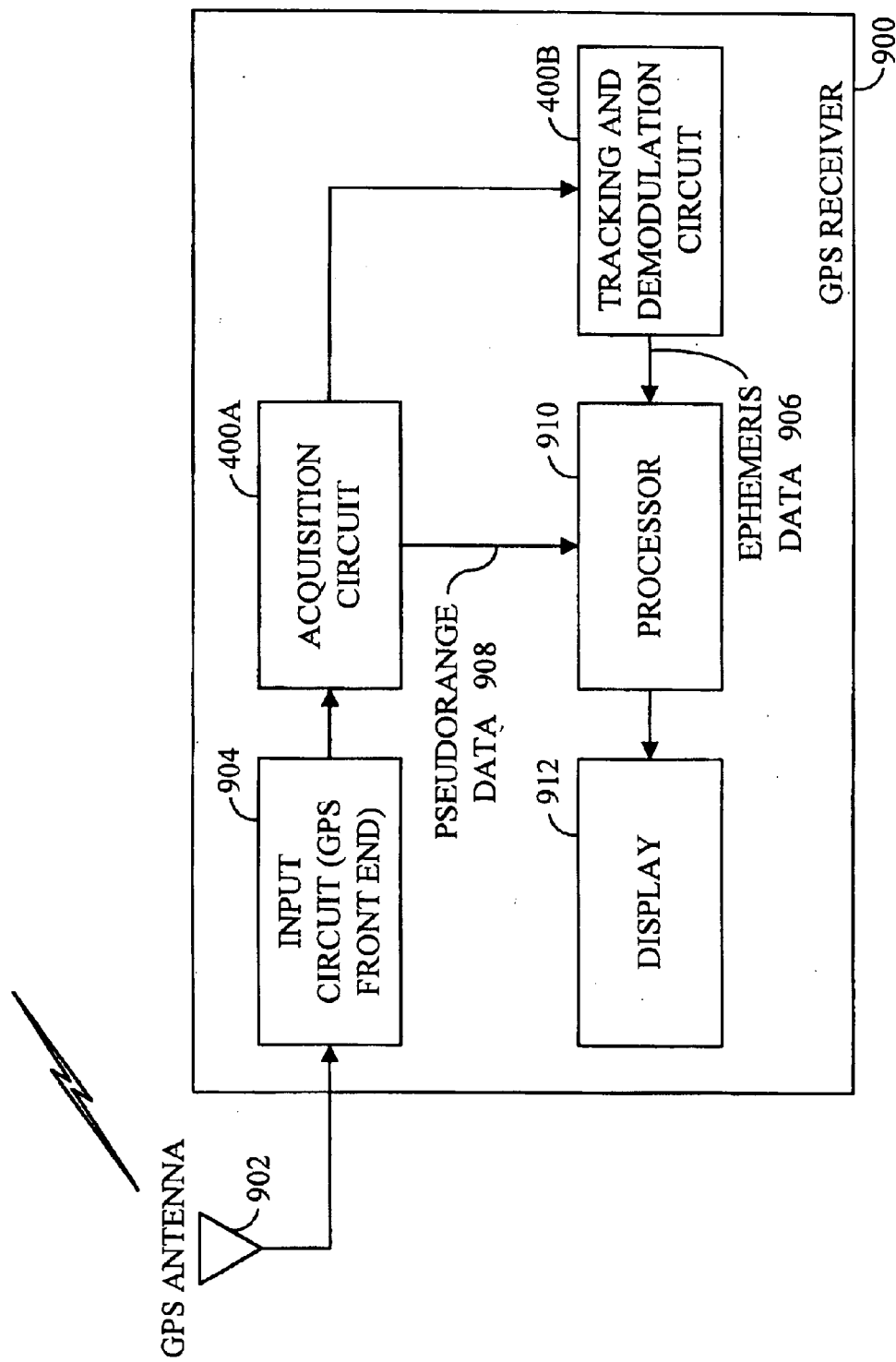
FIG. 3 shows an example of a GPS receiver which may employ an embodiment of the acquisition circuit of the present invention, such as the embodiment shown in FIG. 2A.
Figure 4:
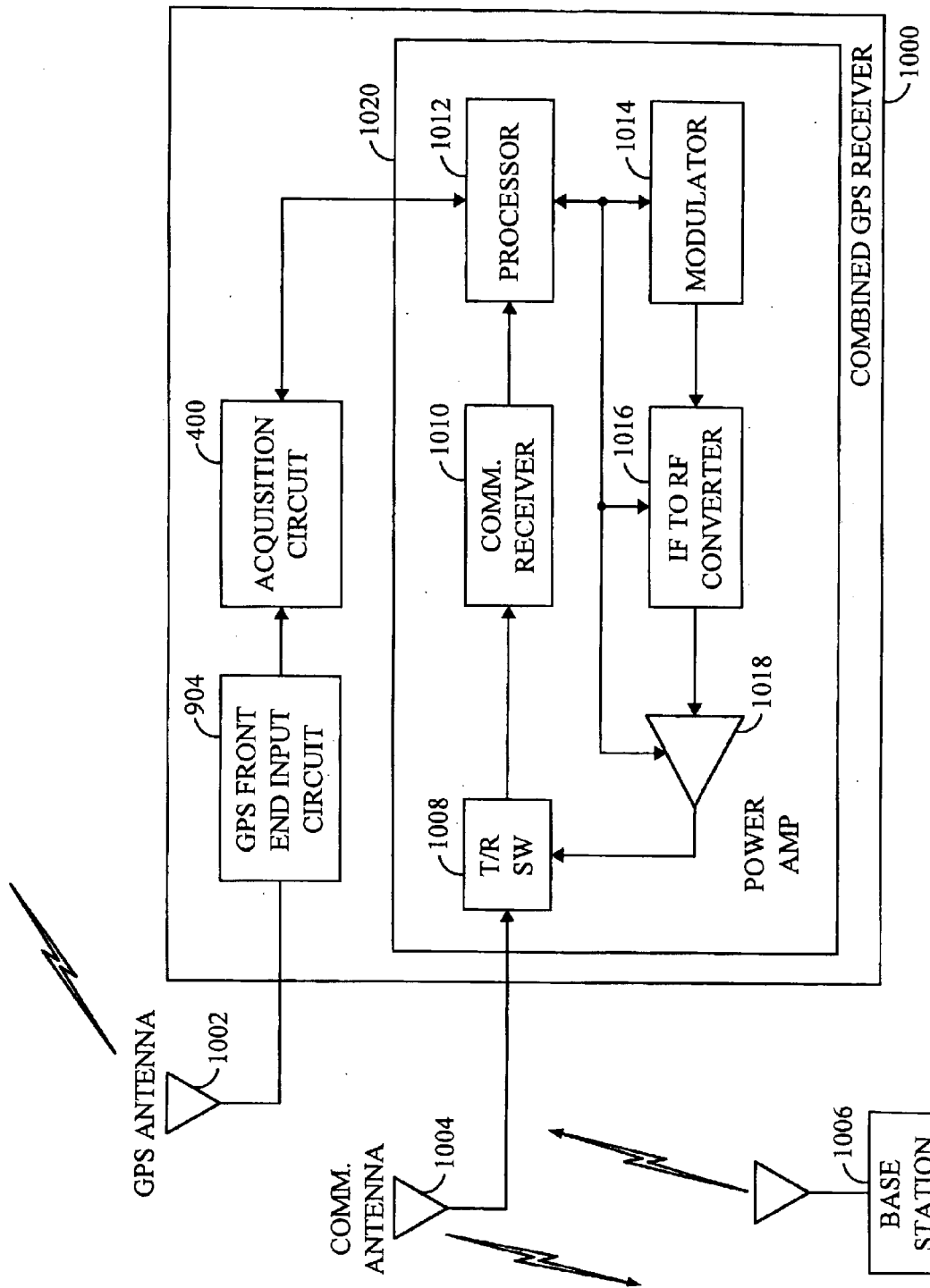
FIG. 4 shows a block diagram representation of a combined GPS receiver which includes an acquisition circuit having a matched filter, such as that shown in FIG. 2A, as well as including a communication system such as a cellular telephone or a two-way pager.

FIG. 2A represents a matched filter structure suitable for processing GPS signals according to one embodiment of the invention; this matched filter is typically part of an acquisition circuit of an SPS receiver such as the acquisition circuit 400A shown in FIG. 3 or the acquisition circuit 400 shown in FIG. 4. The input data 9A to the matched filter is typically in I and Q (complex) format, each with $n_d$ bits of resolution. In FIG. 2A the signal processing for the I or Q channel is shown. Similar processing occurs for the other channel (the PN and FREQ generation circuitry and registers may be shared between the I and Q channels). The input (I or Q) data is continually clocked into the data shift register 10 at rate $f_c$ which is typically 2.048 MHz. The input data 9A is typically digitized GPS signals that have been received and digitized by a GPS front end circuit which has also downconverted the GPS signals to the appropriate frequency (e.g. 2.048 MHz). FIGS. 3 and 4 show two examples of GPS receivers which include such a GPS front end circuit.

The output of the circuit of FIG. 2A is typically provided to additional postprocessing circuitry, which in turn stores further processed results in memory circuitry. This additional postprocessing circuitry is used to combine the outputs of the matched filter corresponding to a multiplicity of PN frames. This improves the GPS receiver sensitivity. The memory circuitry may be accessed by conventional processing circuitry, such as processor 910 and tracking and demodulation circuit 400b in the GPS receiver 900 of FIG. 3, or such as processor 1012 of the combined GPS receiver 1000 of FIG. 4.

It is also possible to utilize the circuitry of FIG. 2A to provide the bulk of the tracking and demodulation function, as well as the acquisition function. This may be done by proper control of the PN generator 16 and frequency generator 17 together with their corresponding shift registers 14 and 15. Although much of the discussion herein focuses on GPS signal acquisition, the invention applies as well to efficiency increase during the tracking and demodulation process.

Prior to performing matched filtering the PN generator 16 generates a PN sequence of data matched to the incoming signal. This PN sequence, typically a set of 1023 logical values 0 and 1, is shifted into a PN code coefficient shift register 14. Once all the PN data is loaded it may be provided to the weighting and summing network 11 which forms the matched filter; optionally, however, a holding register 12 may be utilized. The holding register 12 allows all data from the PN shift register to be utilized by the weighting and summing network on command. Without the holding register 12, the filtering operation would produce erroneous results during the time when the PN shift register is being fed new data from the PN generator. The latter case introduces dead time, during which the filter is basically inactive. The holding register does increase the complexity of the circuitry, and hence this complexity must be traded off against the reduction or elimination of this dead time.

As discussed later, the contents of the PN shift register 14 may be altered by circularly shifting this shift register. This may be done as an alternative to loading new coefficients from PN Generator 16 when the desired change is only a PN epoch change.

Although the input data is typically sampled at a rate of twice the chip rate, and hence the data shift register 10 contains 2046 samples corresponding to one PN frame, the PN shift register and holding register need only have 1023 stages, since there are only 1023 distinct chips per PN frame.

Figure 2B:
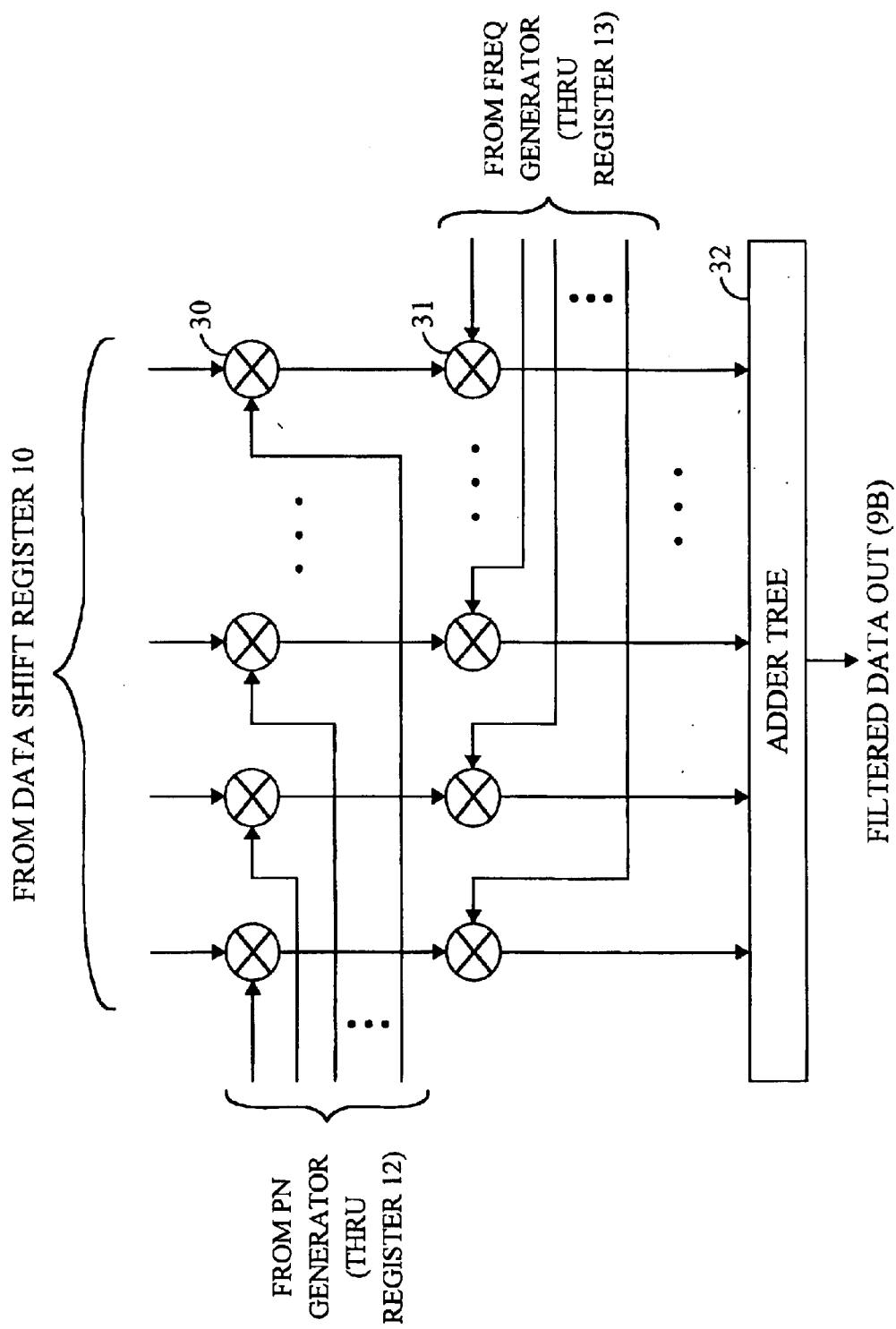
FIG. 2B shows an example of a weighting network that is part of the block diagram of FIG. 2A.

In a similar manner, prior to performing matched filtering, the frequency generator 17 generates a sequence of complex exponential (I and Q) data matched to the residual carrier frequency of the incoming signal. This data sequence, typically a set of 2046 I and Q samples, each with $n_f$ bits of quantization, is shifted into a frequency coefficient shift register 15. Once all the frequency data is loaded it may be provided to the weighting and summing network 11; optionally, however, a holding register 13 may be utilized. Again, the use of the holding register allows rapid provision of the new frequency coefficients to the weighing network without introducing the dead time associated with the loading time of the frequency coefficient shift register. FIG. 2B shows a typical implementation of the weighting and summation network 11 which may be used in the circuit of FIG. 2A. The network 11, as shown in FIG. 2B, includes a series of multipliers 30, each of which receives data from register 10 and register 12 (when register 12 is used, in one embodiment, or from register 14 when register 12 is not used). Network 11 of FIG. 2B also includes a series of multipliers 31, each of which receives an output from a corresponding one of the multipliers 30 and receives data from register 13 (when register 13 is used in one embodiment). The output of multipliers 31 is provided to an adder tree 32 which produces the filtered data out 9B.

In a conventional system, the PN generator and/or frequency generator updates coefficients on an infrequent basis, or at most once per GPS frame, i.e. once per millisecond. Typically, this updating is done to allow tracking of the slight changes of code and carrier frequency versus time due to Doppler effects. In the current invention, this updating occurs multiple times per GPS frame, in order to allow the simultaneous processing of multiple Dopplers and/or multiple GPS codes. As will be discussed below the processing of multiple Dopplers, requires the control of the PN generator in a certain manner.

A GPS signal (C/A code) contains 1023 chips per frame that repeat every 1 millisecond frame period. That is, a GPS frame period is defined by this repeating pattern which repeats every 1 millisecond. As discussed below, it will normally be necessary to alter the PN and frequency coefficients of FIG. 2A in order to process more than one Doppler or PN per GPS frame period.

To simplify discussion assume that a priori knowledge (discussed further below in conjunction with FIG. 7) limits the range of possible code phases to be searched to 64 and that one wishes to process with a single filter one PN code at two different Doppler frequencies. Then, initially, the PN weights would be loaded via the PN Generator 16, the shift register 14 and (optionally) the holding register 12. One can assume that the PN generator can operate at 16 times the chip rate $f_c$. Then it takes 1 millisecond/16=62.5 microseconds to generate the PN coefficients and load them into the shift register 14.

It could take twice this length of time to load the frequency coefficients into the shift register 15 since there are 2046 such coefficients. However, in many cases the system can share a frequency coefficient among a number of adjacent inputs to the weighting network 11, since the frequency coefficients are very slowly varying. The low rate of change of the frequency coefficients is a consequence of their being matched to the residual Doppler frequency of an individual PN channel, which is in the range of ±4 kHz. An analysis indicates that one may choose 32 successive frequency coefficients to have the same value while introducing essentially negligible loss (about 0.06 dB). Thus, for this case instead of loading 2046 coefficients one need only load integer (2046/32) or 64. This only takes about 3.9 microseconds in one embodiment.

Figure 5:
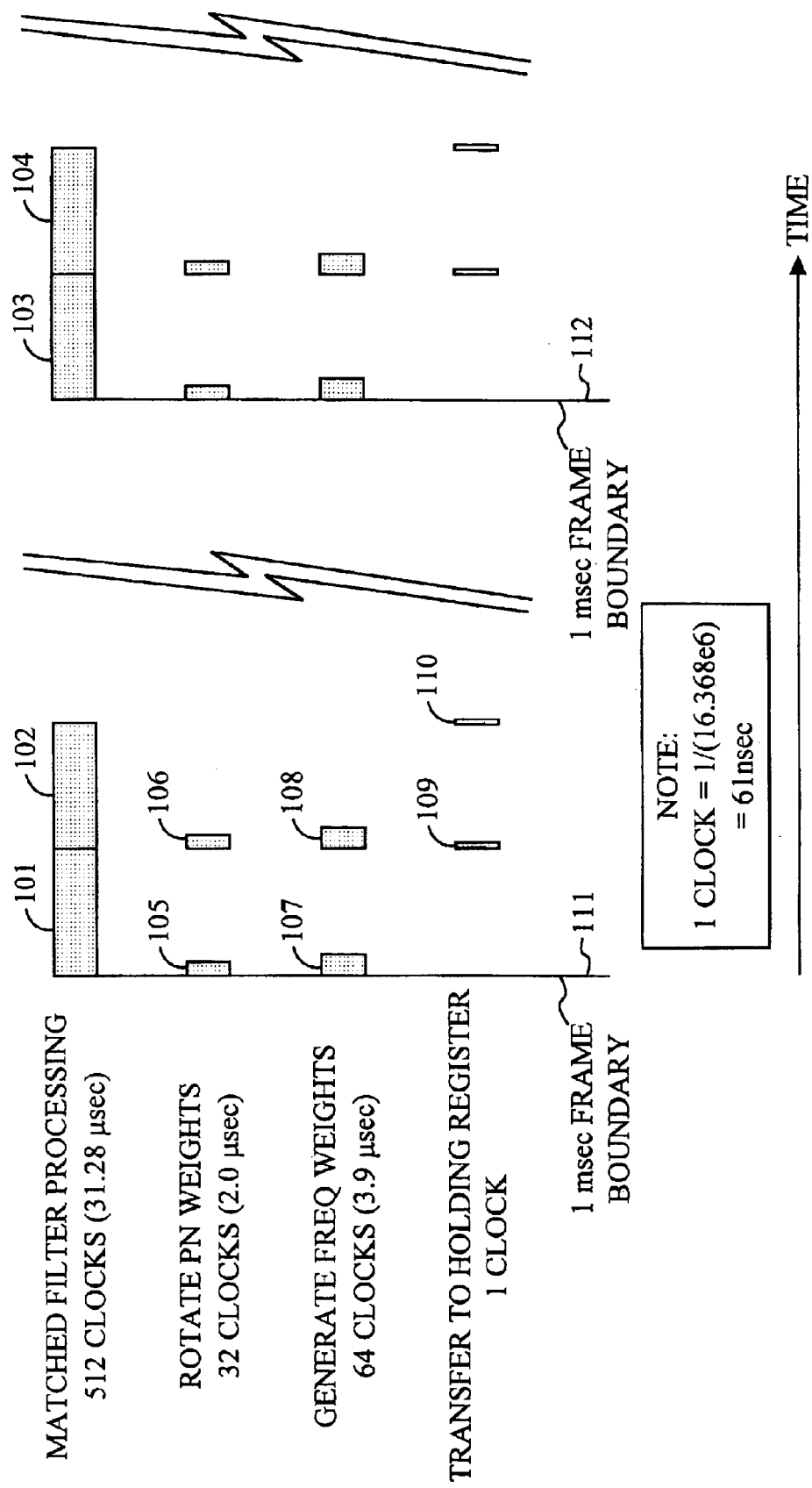
FIG. 5 depicts a timing diagram showing the relationship in time between various processing operations according to one embodiment of the present invention.
Figure 6:
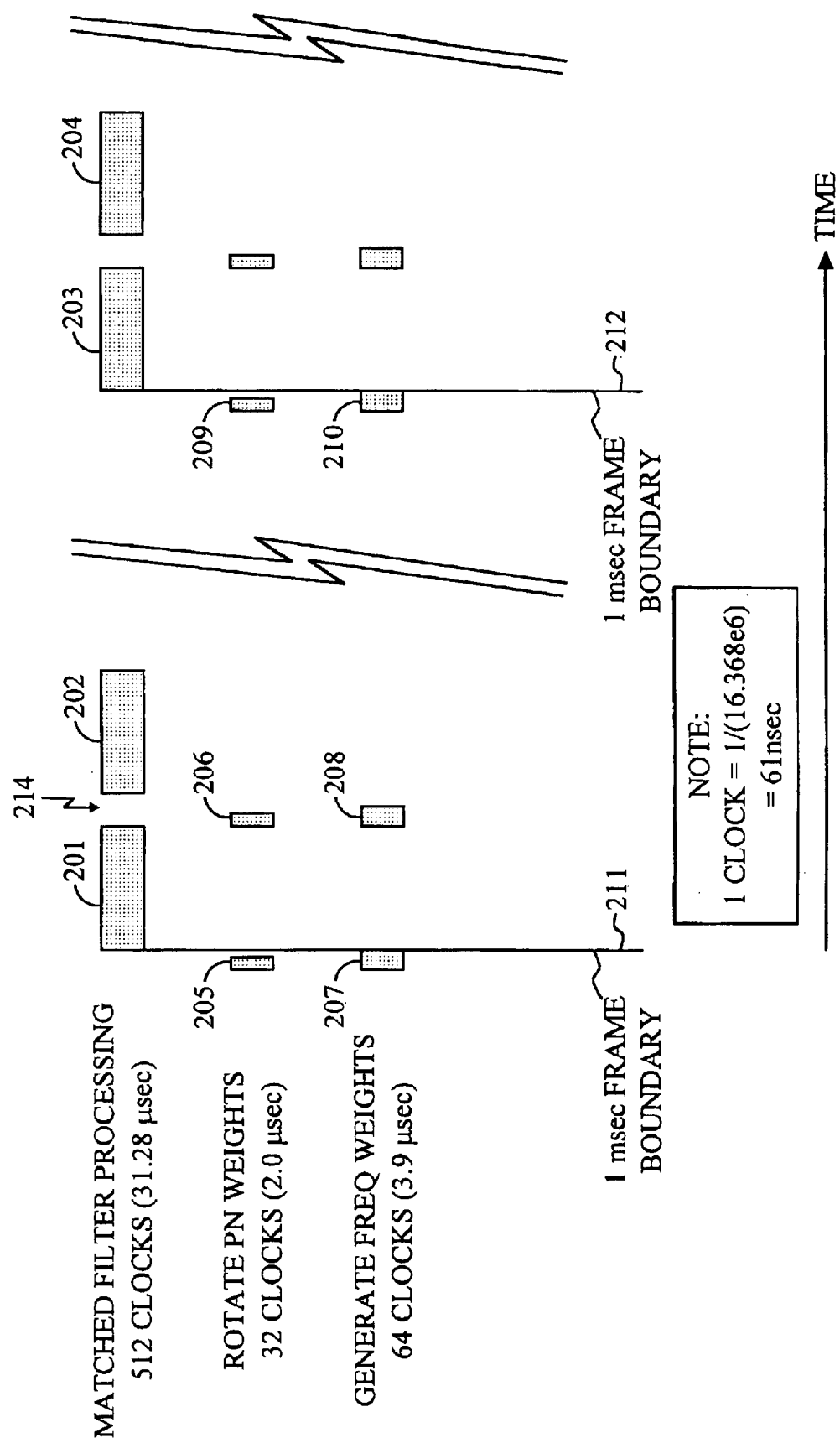
FIG. 6 shows another timing diagram which illustrates various processing operations according to another embodiment of the present invention.

Once the initial coefficients are loaded, the filtering operation can begin. The timing of these events is best understood with the aid of FIGS. 5 and 6. FIGS. 5 and 6 show the relative timing of several operations of the exemplary acquisition circuit shown in FIG. 2A. FIG. 5 shows the case when holding registers 12 and 13 are used. The 1 millisecond frame boundary 111 and boundary 112 represent the duration in time between the repeats of the beginning of the 1023 chips in a PN code (in the case of GPS's standard positioning service). The time intervals 101 and 102 correspond to two different processing windows, each of which utilizes a different set of frequency coefficients. Operations 109 and 110 represent the transfer of PN code coefficients from shift register 14 to register 12 and the transfer of frequency coefficients from shift register 15 to register 13. Operations 109 and 110 are missing from the example shown in FIG. 6 because this example does not use the optional holding registers 12 and 13. Operations 107 and 108 represent the generation of frequency coefficients in two different windows by the frequency generator 17 and the loading, in those windows, of the frequency coefficients from the generator 17 into the shift register 15. These frequency coefficients, after being loaded, are used in the following window in network 11. Operations 105 and 106 represent the rotation (circular shifting) of the PN code coefficients in shift register 14. These coefficients, after rotation, will be used in the next window of processing in network 11. For example, operation 105 involves rotating the PN code coefficients in shift register 14, and after the rotation, these PN code coefficients will be used in the network 11 in window/operation 102.

For the exemplary case of interest where only 64 code phases (32 chips) are examined, the time window per hypothesis corresponds to 64/2.046 MHz=31.28 microseconds (see window/operation 101 for example). During this time required by operation 101, a new set of frequency coefficients, for the next Doppler, may be computed and placed in frequency coefficient shift register 15 (see 107). At the end of the 31.28 microsecond period represented by operation 101, this data (from operation 107) may be transferred in parallel to the holding register 13 (see operation 109) and is processed in the network 11 in window/operation 102 in the next cycle for the network 11. This transfer would only require a maximum one clock period to perform. If the holding register were not present, then as discussed above, the calculation of frequency coefficients would take 3.9 microseconds; hence this would incur a dead period—see operation 214 (FIG. 6). Now, it is also desirable to alter, or circularly shift, the PN coefficients in PN code coefficient shift register 14 so that the matched filter peak will occur within the next 31.28 microsecond processing window at the same relative position as it did for the first processing window. Without any such rotation, the peak would not be present at all within the active window for the new Doppler. The PN shift register's contents are shifted in a circular manner to the right in FIG. 2A (not shown is a connection from the end of the shift register to the beginning but this connection will be understood to be present). If a $16f_c$ clock is used, and holding registers are used, this requires a total of 32 shifts, or 1.96 microseconds. Again, this will not introduce any dead time if a holding register is utilized (notice that operations 101 and 102 are adjacent in time). If holding registers are not utilized, then this will introduce dead time (e.g. dead time 214 in FIG. 6), but for the case of interest here this dead time 214 would be equal to the corresponding to the frequency generation period, or about 3.9 microseconds, since the frequency generation period exceeds the PN rotation period. Also, a small number of additional PN rotations should be used when holding registers are not employed, in order to account for the dead time. Note that the dead time would be the larger of the PN rotation time and the frequency generation time. The former is determined by the size of the matched filter processing window.

After the new PN and frequency coefficients are applied, there again is the 31.28 microsecond filtering processing window (operations 102 or 202 in FIGS. 5 and 6 respectively) which produces matched filter outputs corresponding to 64 one-half chip PN epochs. If holding registers are used, then during this window the frequency coefficients are computed corresponding to the next Doppler (operation 108). This may be transferred into the holding register at the end of this matched filter processing window (operation 110). Without holding registers, the frequency coefficients are computed at the end of the current matched filter processing window 210. Simultaneously it is necessary to circularly shift the PN coefficients backwards by 32 positions (plus dead time if holding registers are not used) in anticipation for processing the first Doppler at the beginning of the next frame. With holding registers present, this may be done concurrently with matched filter processing during the window (see operation 106). Without holding registers this generation (see operation 209 of FIG. 6) must be done following the filter processing. Since there are only two matched filter processing windows per frame in this example, the PN and frequency weights for the first window of the next frame may be computed just after processing the second window of the current frame; alternatively it may be computed just prior to the end of the current frame, as shown in 209 and 210 of FIG. 6. Control logic 20 controls the operations of the generators 16 and 17 and the shift registers 14 and 15 in order to cause them to operate in the manner described. The control logic also determines the appropriate coefficients (e.g. Doppler coefficients) based on the narrowed search range which results from processing the satellite assistance data.

If more than two Dopplers are to be processed per frame, then it will be appreciated that the methods of FIG. 2 or 3 may be easily modified by repeating the timing pattern three or more times instead of the two shown. If the processing windows are the same as in the above example, then the PN weights are rotated to the right prior to each processing block except for the first block. Prior to the first block the PN weights are rotated left by (m−1)×32 chips plus (m−1) times any dead time (expressed in chips) between processing blocks.

There is also an embodiment of the invention in which the matched filter is time shared among more than one PN code corresponding to more than one GPS satellite signal. All the timing diagrams of FIGS. 5 and 6 still apply except that the computation time for the PN coefficients is greater. In particular, it is necessary to compute a full 1023 new coefficients, rather than simply circular shifting the coefficients in a shift register. This requires approximately 62.5 microseconds if the clock rate is $16f_c$. If holding registers are used there will be no dead time in FIG. 5 as long as the matched filter processing window is greater than 64 chips (62.5 microseconds). A maximum of 15 such windows is thus possible (since 64 does not divide evenly into 1023). If holding registers are not used, then the dead time between processing blocks will be at least 62.5 microseconds. A window size of 31.28 microseconds (as in the prior examples), thus implies that one window plus dead time would be around 93.6 microseconds. Hence, a maximum of 10 windows would be possible for this example. Of course, use of a higher internal clock rate will reduce this dead time.

It is, of course, also possible to time-share the matched filter among a set of both Dopplers for a given PN code and several PN codes all during a period which is less than 1 GPS frame period.

Time sharing a matched filter implies that any processing subsequent to the matched filter operation may also need to be time-shared. Such postprocessing includes further Doppler (both carrier and PN) correction, predetection frame integration, postdetection multi-frame integration, and threshold detection. Examples of such postprocessing are described in co-pending U.S. Patent application Ser. No.09/021,854 which was filed on Feb. 11, 1998 and which is entitled "Fast Acquisition, High Sensitivity GPS Receiver," which application is hereby incorporated herein by reference. The nature of the processing steps of the above example is such that the matched filter outputs exit on a regular basis, which allows the postprocessing to be done for the multiple windows per GPS frame in a similar, if not identical, manner.

It may be desirable to further adjust the frequency and PN coefficients on a slow but regular basis to compensate for Doppler effects. This would occur in addition to the adjustments described above.

Even for the case of an acquisition circuit which includes holding registers, it may be the case that the last matched filter processing window in a frame is not contiguous in time with the first window in the next frame. Ample time is required to perform the required left circular shifts of the PN shift register, which compensates for all prior right shift operations in the current frame. This results in some dead time following the last processing window of a GPS frame period.

It is not necessary for the matched filter processing windows in a given GPS frame period to be of equal size, although keeping the window equal in size greatly reduces the complexity of the system control. If multiple matched filters are used in parallel, it is not required that different filters employ the same windows.

The acquisition circuit of the present invention may be used in certain types of standalone GPS receivers, such as the GPS receiver shown in FIG. 3. Alternatively, the acquisition circuit of the present invention may be used in a mobile GPS receiver which is combined with a communication system (see FIG. 4) such as a one-way pager or a two-way pager or a cellular telephone, such as a CDMA or W-CDMA cellular telephone.

As noted above, it is advantageous that the GPS receiver have access to precise time, either through an attached communication system or from an a priori GPS measurement (e.g. in the case of a standalone GPS receiver). In the latter case, an elapsed time counter would maintain accurate time since the last GPS measurement and be able to provide precise time for the next GPS measurement.

FIG. 3 illustrates the implementation of a GPS receiver which uses an acquisition circuit 400A which may be the acquisition circuit shown in FIG. 2A. The GPS receiver 900 of FIG. 3 may be considered a standalone GPS receiver in that there are no communication links providing satellite assistance data separately from the GPS signals themselves. GPS signals are received by GPS antenna 902 and input to GPS receiver 900 through the input circuit 904. The PN codes within the received GPS signals are acquired and tracked in circuit 400A together with an external processor 910 in accordance with the operation described above with respect to FIGS. 2A, 5, and 6. The output of acquisition circuit 400A includes the pseudorange data 908 corresponding to the signals received from each GPS satellite from which a signal was received. Each satellite also transmits ephemeris and time-of-week data which is received by input circuit 904 and demodulated by circuit 400B. The processor 910 processes the ephemeris and pseudorange data to determine the location of the mobile GPS receiver 900. The output of processor 910 drives an input/output device such as the display device 912 which graphically or texturally displays the location of the unit. In this configuration, the circuit of FIG. 2A performs both the acquisition and tracking functions together with the processor 910. The necessary satellite assistance data, including precise time maintained by a counter, may be stored from prior receptions of GPS signals (e.g. satellite almanac may be stored) and the user may input an approximate location to an input device which is coupled to the GPS receiver 900 (e.g. a keyboard or touch screen display).

FIG. 4 shows a combined GPS receiver 1000 which includes a GPS receiver implemented with an acquisition circuit 400 which includes a matched filter system such as that shown in FIG. 2A. The combined GPS receiver 1000 also includes a communication system such as a one-way or two-way pager or a cellular telephone system, such as a CDMA or W-CDMA cellular telephone system. The communication system allows satellite assistance data such as time-of-day, or approximate location, or satellite ephemeris data, or Doppler information for satellites in view to be transmitted to and received by the combined GPS receiver 1000 which can then utilize this information to determine a narrowed search range. The GPS signals are received through antenna 1002 and processed by the GPS front end input circuit 904 and provided to the acquisition circuit 400 which may be a matched filter system such as that shown in FIG. 2A. The output from the acquisition circuit, such as the output 9B, is provided to a processor 1012 which processes the pseudorange information from the acquisition circuit 400 and also demodulates the ephemeris data contained in the output 9B in order to determine the position of the combined GPS receiver 1000. The communication system 1020 in the case shown in FIG. 4 is a two-way communication system which contains a transmit/receive switch 1008 which routes communication signals (typically RF) to and from communication antenna 1004 and receiver 1000. Received communication signals are input to communication receiver 1010 and passed to processor 1012 for processing. Communication signals to be transmitted from processor 1012 are propagated to modulator 1014 and frequency converter 1016. Power amp 1018 increases the gain of a signal to the appropriate level for transmission to a basestation 1006 which may be a cellular transmission site (also referred to as a cell site) or may be a single basestation which supports point-to-point communications between the basestation and the receiver 1000. In one embodiment of the present invention, the basestation 1006 may determine the location of the receiver 1000 based upon the GPS derived pseudorange data from the remote receiver and ephemeris data received from its own GPS receiver or from other sources of such ephemeris data. The location data can then be transmitted back to the GPS receiver 1000 or to other remote locations.

FIG. 7 shows an example of a method for using satellite assistance data in order to determine a search range to acquire GPS signals. This allows for the matched filter to search over a smaller search space, thereby allowing the matched filter to be time shared among different Dopplers and/or different GPS satellite signals. Operation 301 involves the determination of the satellite assistance data. This may be received from a cellular telephone site, such as a CDMA basestation or cell site. This data typically includes the time-of-day information such as the GPS-based time within the CDMA signal (see U.S. Pat. No. 5,945,944) and it may further include the approximate position of the mobile GPS receiver itself based upon the determination of the particular cell site/basestation which is communicating with the mobile GPS receiver (see co-pending U.S. patent application Ser. No. 08/842,559, which was filed Apr. 15, 1997). This satellite assistance data may also include satellite positioning information such as satellite ephemeris data which is used to estimate the range of a satellite relative to the mobile GPS receiver. This ephemeris data allows for the computation of the Dopplers to the various satellites in view. Alternatively, this satellite assistance data may include Doppler information transmitted from the basestation, such as a cellular telephone site, to the mobile GPS receiver, such as the receiver 1000 shown in FIG. 4. In another alternative, this assistance data may include the timings of the PN frame epochs of the various GPS signals as observed by such a basestation. Above-noted co-pending U.S. patent application Ser. No. 08/842,559 which was filed Apr. 15, 1997, provides various examples of satellite assistance data and how this data is determined and communicated to a mobile GPS receiver, such as the receiver 1000. After determining or obtaining the satellite assistance data, the mobile GPS receiver, such as the receiver 1000, determines the search range to acquire the GPS signals based upon the satellite assistance data. Various known techniques for determining the search range may be utilized. Examples of such search techniques are described in co-pending U.S. patent application Ser. No. 09/132,556 which was filed Aug. 11, 1998 and which is hereby incorporated herein by reference. After determining the search range, operation 305 acquires the GPS signals in the matched filter circuit and this operation may perform the methods of either FIG. 8 or FIG. 9 or a combination of these methods shown in FIGS. 8 and 9.

FIG. 8 represents the embodiment in which a matched filter is shared over multiple Doppler frequencies such that a GPS signal is processed in a matched filter using a first set of frequency coefficients during a first window of time and the signal (typically later in time) is processed using a second set of frequency coefficients during a second window of time. The first window of time and the second window of time occur within a period of time which is not greater than one SPS frame period.

FIG. 9 represents an embodiment in which a matched filter is shared over multiple GPS signals and where this sharing occurs within the time period which is not greater than one SPS frame period.

The foregoing description shows various methods and apparatuses for sharing a matched filter over time which can improve acquisition and tracking and reacquisition performance without resulting in any loss of received signal sensitivity. These methods and apparatuses are particularly advantageous when certain a priori signal parameter knowledge is available.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a PN code modulated on an L-band carrier signal, generally synchronized with GPS time. Each transmitter may be assigned a unique PN code so as to prevent identification by a remote receiver. Pseudolites are useful in situations where GPS signals from an orbiting satellite might be unavailable. The term "satellite," as used herein, is intended to include pseudolites or equivalent of pseudolites, and the term "GPS signals," as used herein, is intended to include GPS-like signals from pseudolites or equivalents of pseudolites.

In the preceding discussion the invention has been described with reference to application to the United States Global Positioning System (GPS). It should be evident, however, that these methods are equally applicable to similar satellite positioning systems. The term "GPS" as used herein includes such alternative satellite positioning systems, and the term "GPS signals" includes signals from alternative satellite positioning systems.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A method for processing substantially concurrently at least two Doppler frequencies of a Satellite Positioning System (SPS) signal, said method comprising:

determining a first set of frequency coefficients corresponding to a first Doppler frequency of said SPS signal;

processing said SPS signal in a matched filter with said first set of frequency coefficients during a first window of time;

determining a second set of frequency coefficients corresponding to a second Doppler frequency of said SPS signal;

processing said SPS signal in said matched filter with said second set of frequency coefficients during a second window of time;

wherein said first and said second windows of time occur within a period of time not greater than one SPS frame period.

2. A method as in claim 1 wherein said first window of time and said second window of time are different and non-overlapping and occur consecutively in time within said period of time.

3. The method of claim 1 further comprising:

generating a series of pseudonoise (PN) coefficients corresponding to said SPS signal;

processing said SPS signal in said matched filter with a first set of PN coefficients during said first window, wherein said first set of PN coefficients is generated by circularly shifting said series of PN coefficients by a first count; and processing said SPS signal in said matched filter with a second set of PN coefficients during said second window, wherein said second set of PN coefficients is generated by circularly shifting said series of PN coefficients by a second count.

4. A method as in claim 1 further comprising:

storing said first set of frequency coefficients in a first register;

storing said second set of frequency coefficients in said first register.

5. A method as in claim 4 wherein said first register is coupled to a first input of said matched filter and wherein said storing of said first set of frequency coefficients occurs before said processing of said SPS signal with said first set of frequency coefficients and wherein said storing of said second set of frequency coefficients occurs before said processing of said SPS signal with said second set of frequency coefficients.

6. A method as in claim 3 further comprising:

storing said first set of PN coefficients in a second register;

storing said second set of PN coefficients in said second register.

7. A method as in claim 6 wherein said second register is coupled to a second input of said matched filter and wherein said storing of said first set of PN coefficients occurs before said processing of said SPS signal with said first set of PN coefficients and wherein said storing of said second set of PN coefficients occurs before processing of said SPS signal with said second set of PN coefficients.

8. A method as in claim 4 further comprising:

storing a first set of PN coefficients in a second register;

storing a second set of PN coefficients in said second register.

9. A method as in claim 8 wherein said second register is coupled to a second input of said matched filter and wherein said storing of said first set of PN coefficients occurs before processing of said SPS signal with said first set of PN coefficients and wherein said storing of said second set of PN coefficients occurs before processing of said SPS signal with said second set of PN coefficients.

10. A method for processing substantially concurrently at least two different Satellite Positioning System (SPS) signals, said method comprising:

determining a first set of pseudonoise (PN) coefficients corresponding to a first SPS signal;

processing said first SPS signal in a matched filter with a first set of PN coefficients during a first window of time;

determining a second set of PN coefficients corresponding to a second SPS signal; and processing said second SPS signal in said matched filter with said second set of PN coefficients during a second window of time;

wherein said first and said second windows of time occur within a period of time not greater than one SPS frame period.

11. The method of claim 10 further comprising:

processing said first SPS signal in said matched filter with a first set of frequency coefficients during said first window; and processing said second SPS signal in said matched filter with a second set of frequency coefficients during said second window.

12. The method of claim 10 further comprising storing said first set of PN coefficients to a first register and storing said second set of PN coefficients to said first register.

13. The method of claim 12 further comprising storing said first set of frequency coefficients to a second register and storing said second set of frequency coefficients to said second register.

14. A method as in claim 13 wherein said first register is coupled to a first input of said matched filter and said second register is coupled to a second input of said matched filter.

15. A method as in claim 14 wherein said storing of said first set of PN coefficients and said storing of said first set of frequency coefficients occurs before said processing of said first SPS signal in said matched filter and wherein said storing of said second set of PN coefficients and said storing of said second set of frequency coefficients occurs before said processing of said second SPS signal in said matched filter.

16. A method as in claim 10 wherein said first window of time and said second window of time are different and non-overlapping and occur consecutively in time within said period of time.

17. A method as in claim 10 wherein said first set of PN coefficients is generated from a series of PN coefficients by circularly shifting said series of PN coefficients by a first count and wherein said second set of PN coefficients is generated by circularly shifting said series of PN coefficients by a second count.

18. A method as in claim 10 further comprising:

determining a search range, for acquiring at least one of said first SPS signal and said second SPS signal, from a satellite assistance data.

19. A method as in claim 11 wherein said satellite assistance data comprises at least one of (a) Doppler information relative to an SPS satellite; (b) satellite ephemeris data for an SPS satellite; (c) approximate location of a mobile SPS receiver which includes said matched filter; (d) time-of-day information or (e) time of occurrence of the pseudonoise framing epoch of a signal from an SPS satellite.

20. A circuit for substantially concurrently processing at least two Doppler frequencies of a Satellite Positioning System (SPS) signal, said circuit comprising:

an input circuit for receiving said SPS signal;

a data shift register coupled to said input circuit, said data shift register storing said SPS signal;

a matched filter circuit coupled to said data shift register, said matched filter circuit computing an output based on said SPS signal;

a pseudonoise (PN) weight generation circuit having an output, said PN weight generation circuit determining a set of PN coefficients corresponding to said SPS signal;

a PN data shift register having an input which is coupled to said output of said PN weight generation circuit and having an output which is coupled to a first input of said matched filter circuit;

a frequency coefficient generation circuit having an output, said frequency coefficient generation circuit determining a first set of frequency coefficients during a first interval of time and a second set of frequency coefficients during a second interval of time, wherein said first interval of time and said second interval of time occur within a time period no greater than one SPS frame period;

a frequency data shift register having an input which is coupled to said output of said frequency coefficient generation circuit and having an output which is coupled to a second input of said matched filter circuit;

a storage circuit coupled to an output of said matched filter circuit, said storage circuit to store in a first set of memory locations a first output of said matched filter circuit corresponding to said first set of frequency coefficients during a third interval of time, and said storage circuit to store in a second set of memory locations a second output of said matched filter circuit corresponding to said second set of frequency coefficients during a fourth interval of time, wherein said third interval of time and said fourth interval of time occur within a time period no greater than one SPS frame period.

21. A circuit as in claim 20 wherein said first interval of time and said second interval of time are different and non-overlapping and occur consecutively in time within said time period.

22. A circuit as in claim 21 wherein said one SPS frame period is defined by a repetition period of PN data in said SPS signal.

23. A circuit as in claim 20 further comprising:

a control circuit coupled to said frequency coefficient generation circuit, said control circuit controlling when said frequency coefficient generation circuit generates said first set of frequency coefficients and said second set of frequency coefficients.

24. A circuit as in claim 20 further comprising:

a first register having an input coupled to said output of said frequency data shift register and having an output coupled to said second input of said matched filter circuit.

25. A circuit as in claim 20 further comprising:

a second register having an input coupled to said output of said PN data shift register and having an output coupled to said first input of said matched filter circuit, wherein said matched filter circuit is coupled to said PN data shift register through said second register.

26. A circuit as in claim 20 wherein said PN weight generation circuit determines a series of PN coefficients corresponding to said SPS signal and wherein said matched filter circuit processes said SPS signal with a first set of PN coefficients during said first interval of time, said first set of PN coefficients being generated by first circularly shifting said series of PN coefficients by a first count and wherein said matched filter circuit processes said SPS signal with a second set of PN coefficients during said second interval of time, said second set of PN coefficients being generated by second circularly shifting said series of PN coefficients by a second count.

27. A circuit as in claim 26 wherein said first circularly shifting and said second circularly shifting are performed by said PN data shift register.

28. A circuit for substantially concurrently processing at least two Satellite Positioning System (SPS) signals each having a distinct PN spreading code, said circuit comprising:
- an input circuit for receiving said SPS signal;
- a data shift register coupled to said input circuit, said data shift register storing said SPS signal;
- a matched filter circuit coupled to said data shift register to receive said SPS signal and to process said SPS signal;
- a pseudonoise (PN) weight generation circuit having an output, said PN weight generation circuit determining a first set of PN coefficients corresponding to a first SPS signal during a first interval of time and determining a second set of PN coefficients corresponding to a second SPS signal during a second interval of time;
- wherein said first interval of time and said second interval of time occur within a time period no greater than one SPS frame period;
- a PN data shift register having an input which is coupled to said output of said PN weight generation circuit and having an output which is coupled to a first input of said matched filter circuit;
- a storage circuit coupled to an output of said matched filter circuit, said storage circuit to store in a first set of memory locations a first output of said matched filter circuit corresponding to said first set of PN coefficients during a third interval of time, and to store in a second set of memory locations a second output of said matched filter corresponding to said second set of PN coefficients during a fourth interval of time, wherein said third interval of time and said fourth interval of time occur within a time period no greater than one SPS frame period.

29. A circuit as in claim 28 further comprising:
- a frequency coefficient generation circuit having an output, said frequency coefficient generation circuit determining a first set of frequency coefficients during said first interval of time and a second set of frequency coefficients during said second interval of time;
- a frequency data shift register having an input which is coupled to said output of said frequency coefficient generation circuit and having an output which is coupled to a second input of said matched filter circuit.

30. The circuit of claim 28 further comprising a first register coupled to the output of said PN data shift register and coupled to the first input of said matched filter circuit.

31. The circuit of claim 29 further comprising a second register coupled to the output of said frequency data shift register and coupled to the second input of said matched filter circuit.

32. A circuit as in claim 28 wherein said first interval of time and said second interval of time are different and non-overlapping and occur consecutively in time within said time period.

33. A circuit as in claim 32 wherein said one SPS frame period is defined by a repetition period of PN data in said SPS signal.

34. A circuit as in claim 28 further comprising:
- a control circuit coupled to said frequency coefficient generation circuit, said control circuit controlling when said frequency coefficient generation circuit generates said first set of frequency coefficients and said second set of frequency coefficients.

* * * * *